N. EATON.
Steam-Generator.
No. 228,250.    Patented June 1, 1880.
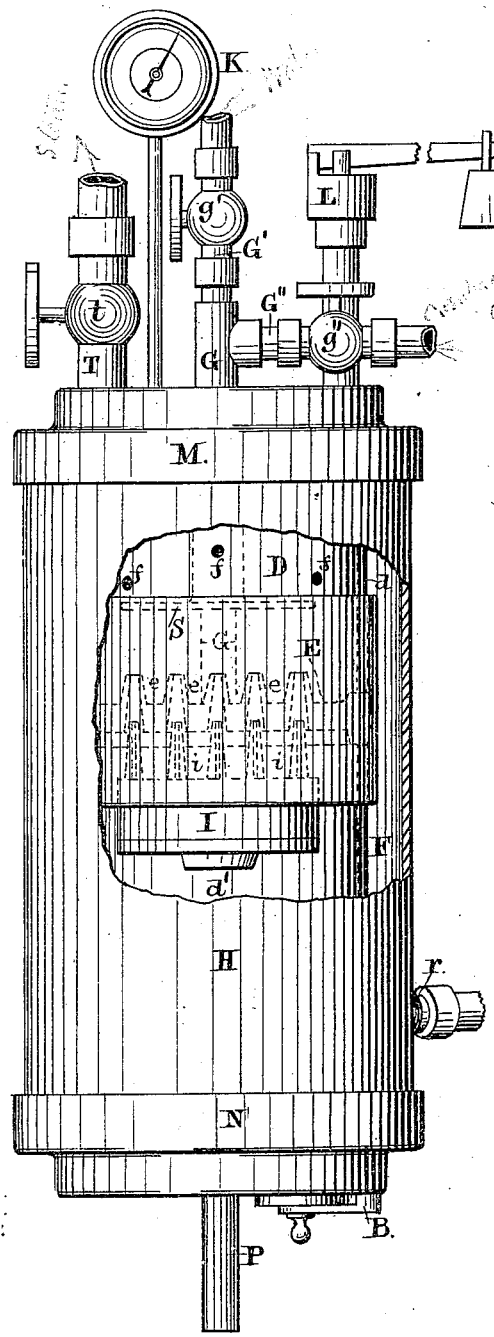
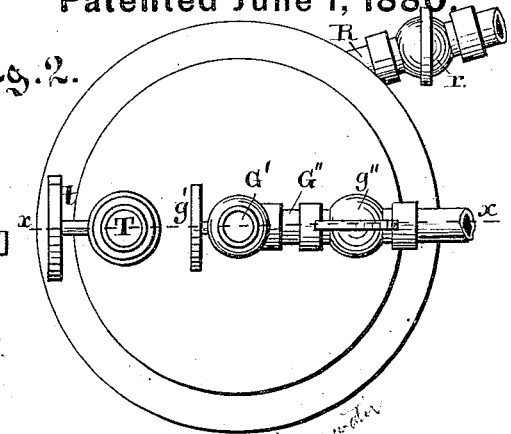
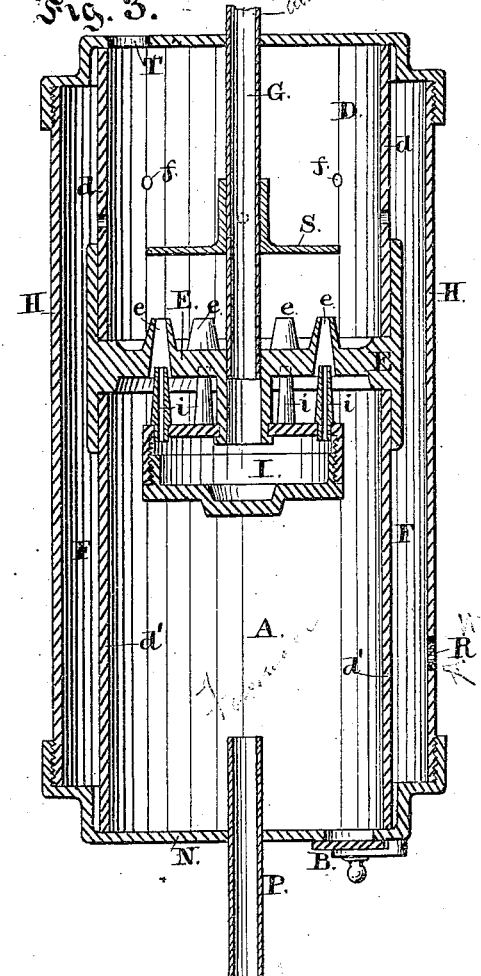
Witnesses:
Rebecca Gilman Ellis.
Martha Anna Capen.
Inventor:
Norman Eaton

UNITED STATES PATENT OFFICE.

NORMAN EATON, OF WOBURN, MASSACHUSETTS.

STEAM-GENERATOR.

SPECIFICATION forming part of Letters Patent No. 228,250, dated June 1, 1880.

Application filed January 2, 1880.

*To all whom it may concern:*

Be it known that I, NORMAN EATON, of Woburn, in the county of Middlesex and State of Massachusetts, have invented a new and Improved Steam-Generator, of which the following is a specification.

The nature of my invention relates to generating steam by bringing heat and products of combustion into immediate contact with water, its objects being to generate steam with safety and convenience and to economize fuel.

The following introduction is a brief statement of what the invention consists, its mode of operation and its construction being fully described hereinafter.

First and essentially, in a closed chamber into which water is forced, a furnace, and a partition which is arranged with injectors, and through which heat and products of combustion from said furnace are injected into said chamber, whereby steam is generated, a pipe being provided to supply air and water to operate the injectors, a pipe through which the water to be converted into steam is forced into the closed chamber, and a pipe for the exit of the steam.

Second, in a combination of a box or drum carrying injection-tubes with a furnace, a closed chamber into which water is forced, and a partition having nozzles, which, together with the said injection-tubes, constitutes the injectors, whereby heat and products of combustion from the said furnace are injected into the said chamber, a pipe being provided to supply air and water to operate the injectors, a pipe through which water is forced into the closed chamber, and a pipe for the exit of steam. By means of this combination the air and water will operate the injectors with greater energy, as hereinafter explained.

Third, in the combination of a furnace, a damper, a closed chamber into which water is forced, and partition through which heat and products of combustion from the said furnace are injected into said chamber, a pipe being provided to supply air and water to operate the injectors, a pipe through which water is forced into the closed chamber, and a pipe for the exit of the steam. By means of this combination the air which is drawn through the furnace by the injectors may be conveniently regulated, as hereinafter explained.

Fourth, in a combination of an outer case with a furnace, a closed chamber into which water is forced, and a partition through which heat and products of combustion from said furnace are injected into said chamber, a pipe being provided to supply air and water to operate the injectors, a pipe through which water is forced into the closed chamber, and a pipe for the exit of the steam. By means of this combination radiant heat that would otherwise be wasted will be arrested by the water that is forced into the closed chamber, as hereinafter explained.

To clearly define the fifth part of my invention, I will state that to operate the injectors already mentioned it is desirable to employ the most economical as well as efficient agents. Enough air should be used to perfect the combustion of the gases and particles passing through the injectors. Further than this something less expensive than compressed air, and capable of exerting the required expansive force, may be used, and the best for this purpose is water. In other words, a given quantity of compressed air will act with greater efficiency if water is forced through the injectors with it. Now, this part of my invention consists in combining a pipe through which water is forced with the pipe that supplies the injectors with compressed air, when the said combination of pipes is adapted for the purpose stated, and exists, as hereinafter described, in a steam-generator provided with a main water-supply pipe and an exit-pipe for the steam, and which is composed of a furnace, a closed chamber into which water is forced, and a partition arranged with injectors, through which heat from the said furnace is injected into the said chamber.

In the accompanying drawings the same letters refer to the same parts, except in Figure 3 letters P R T designate places occupied by parts denoted by the same letters in the other figures.

In the different figures I have also changed the relative positions of the pipes connected with the generator, so they are clearly represented, but without changing their operation.

In order that the invention may be readily inspected the parts H, E, M, N, *d*, and *d'* are held together by screw-fittings; but in a large machine these parts would be strongly bolted together.

Fig. 1 is an elevation of the generator, represented as standing unsupported, and with pieces broken off to show the injectors inside, the obscure parts of which are represented by dotted lines. Fig. 2 is a plan. Fig. 3 is a vertical section taken through broken line *x* of plan, looking down at an angle of about sixty degrees from a horizontal plane—pipe G and damper B in perspective.

A is the furnace, formed by case *d'*, and closed below by part N, having a damper, B, to regulate the supply of air to the fire, also a pipe, P, which supplies the fuel. In this instance the furnace is arranged to burn fuel in a fluid state; but as the furnace in itself forms no part of my invention, only so far as it is combined with other essential parts, I do not confine myself to any particular form of it or any special fuel.

A partition, E, separates furnace A and a chamber, D, which may be termed a "generating-chamber." Secured to a hollow stem of this partition, and within the furnace, is a box or drum, I, carrying tubes *i*, each of which projects into conically-shaped openings *e* through partition E, each thus forming an injector by which the heat of the furnace is forced into the generating-chamber. There may be more or less of these injectors; but I prefer to have enough of them to distribute the fire well in the generating-chamber rather than concentrate it. These injectors are operated with compressed air supplied by an air-compressor (not shown in the drawings) through pipe G'', which delivers it into pipe G, thence into box or drum I, whence it escapes through the injectors into the generating-chamber D. This chamber is formed by case *d*, partition E, and part M, made steam-tight and strong enough to withstand great internal pressure.

Water is forced into the chamber through orifices *f*, of which there may be more or less in number; but they should be of such size that the water to be converted into steam shall enter it finely divided or as spray.

S is a plate or check, whose function is to prevent any back flow from the generating-chamber through openings *e* into the furnace when the injectors are not in operation. It flies up when the injectors are operated, and falls, closing the openings *e*, when the operation of the injectors is stopped.

To arrest radiant heat, furnace A and chamber D are inclosed by a case, H, leaving a space, F, closed tightly at each end by parts M and N. Water is forced (by some forcing device not shown in the drawings) through pipe R into this space F, thence through orifices *f* into chamber D. If the generator is made without the water-space F the pipe R should directly enter chamber D and be provided with a nozzle or spray attachment answering the purpose of orifices *f*.

G' is a pipe through which water is forced into pipe G with the compressed air from pipe G''. This is to give the compressed air greater efficiency in operating the injectors, and this water is finally converted into steam and added to the volume in chamber D.

T is a pipe which conducts steam from the generating-chamber to wherever it may be used or into a reservoir, as may be required, for I prefer not to generate a very large volume of steam in one chamber, but, when more steam is to be used than can be generated with convenience or safety in one chamber, to have two or more generators connected with a common reservoir, or two or more chambers arranged with one furnace, as a battery, and connected with a common reservoir.

The generator may be used without the furnace being closed below, as by part N; but by closing the furnace so that the amount of air drawn through it can be regulated the fire can be better controlled, and the tendency of unconsumed particles entering the generating-chamber through the injectors by too much air being drawn through the fire may be obviated. So I have provided the furnace with a damper, B.

The pipes G'', G', R, and T are provided with valves or stop-cocks, so that the quantity of compressed air, water used with the compressed air, the main supply of water to be converted into steam, and the outflow of steam from the generating-chamber can be conveniently regulated or shut off.

In Fig. 1 of the drawings the generator is represented as furnished with a steam-gage, K, and a safety-valve, L.

The operation of the device is as follows: A fire is lighted in the furnace, damper B and stop-cock *t* being open. Stop-cocks *g''* and *r* are then opened, water is forced into the generating-chamber, and compressed air rushes through pipe G into the box I, where it acquires additional tension from the heat of the furnace before it escapes through the injectors, carrying the fire and products of combustion of the furnace with it into the generating-chamber, where they meet the spray of water, which is at once flashed into steam and conducted from the generating-chamber by pipe T. The water in passing through the space F is heated, and is thus in a favorable condition for conversion into steam.

The amount of steam to be generated and its tension are regulated by stop-cocks *r* and *g''*. For instance, if it is desired to generate steam of low temperature and slight tension stop-cock *r* may be opened, so that a heavy spray of water will enter the generating-chamber, filling it above the level of the openings *e*; so when heat is injected into this chamber it will pass through this water or be absorbed by it, according to the force with which the injectors are operated. By fully opening stop-cock $g''$, thus allowing a heavy charge of compressed air to escape through the injectors, drawing a large amount of heat into the generating-chamber, and partially closing stop-cock $r$, allowing a smaller amount of water to enter this chamber, steam of increased tension will be generated.

If stop-cock $g'$ is opened water is forced into pipe G with the compressed air, and is converted into steam in the box I, or as it passes through the injectors, thereby creating considerable expansive force in itself, and adds to the impact of the compressed air.

After the generator is put in operation the damper B is adjusted to allow more or less air to be drawn through the fire, as the experience of the operator may determine.

When it is desired to stop the operation of the generator the compressed air is shut off from the injectors by closing stop-cock $g''$, and as the compressed air ceases to rush through the injectors the check S will close the openings $e$. The stop-cock $t$ should also be closed to prevent any back flow of steam into the generating-chamber. This chamber is then cooled by the water which is forced into it. In this method of bringing heat into immediate contact with water for generating steam the fire burns freely, there being no undue pressure upon it. Furthermore, the combustion is perfected, for any particles leaving the furnace unconsumed are consumed as they come in contact with the compressed air in passing through the injectors; also, the heat is almost entirely economized, being absorbed by the water or vapor in the generating-chamber, and the generator can be quickly put in operation, there being no large body of water to heat before steam is generated.

The pipes G G'' may be considered as one pipe or as separate parts of the same pipe.

What I claim is—

1. In a steam-generator provided with air and water pipe G, water-supply pipe R, and exit-pipe T, a closed generating-chamber, D, into which water is forced, and separated from a furnace by a partition, E, through which the products of combustion from said furnace are injected into said chamber, substantially as described.

2. In a steam-generator provided with pipes G, R, and T, the combination of furnace A, chamber D, and partition E, having nozzles $e$, with box or drum I, carrying injection-tubes $i$, substantially as described.

3. In a steam generator provided with pipes G, R, and T, the combination, substantially as described, of furnace A, damper B, partition E, having nozzles $e$, and closed generating-chamber D, all operating together, substantially as set forth.

4. In a steam-generator provided with pipes G, R, and T, the combination, substantially as described, of outer case, H, with furnace A, closed generating-chamber D, into which water is forced, and partition E, carrying nozzles $e$, operating as set forth and shown.

5. In a steam-generator provided with pipes G, R, and T, and injectors $i\ e$, by means of which the products of combustion from furnace A are injected through partition E into closed generating-chamber D, and into which water is forced, the combination of pipes G G'' with pipe G', they being adapted to supply water and air to operate injectors $i\ e$, in the manner and for the purpose herein set forth.

NORMAN EATON.

Witnesses:
REBECCA GILMAN ELLIS,
MARTHA ANNA CAPRON.